C. HODGKINS.
Sewing Machine.
No. 2,746.
Reissued Aug. 20, 1867.
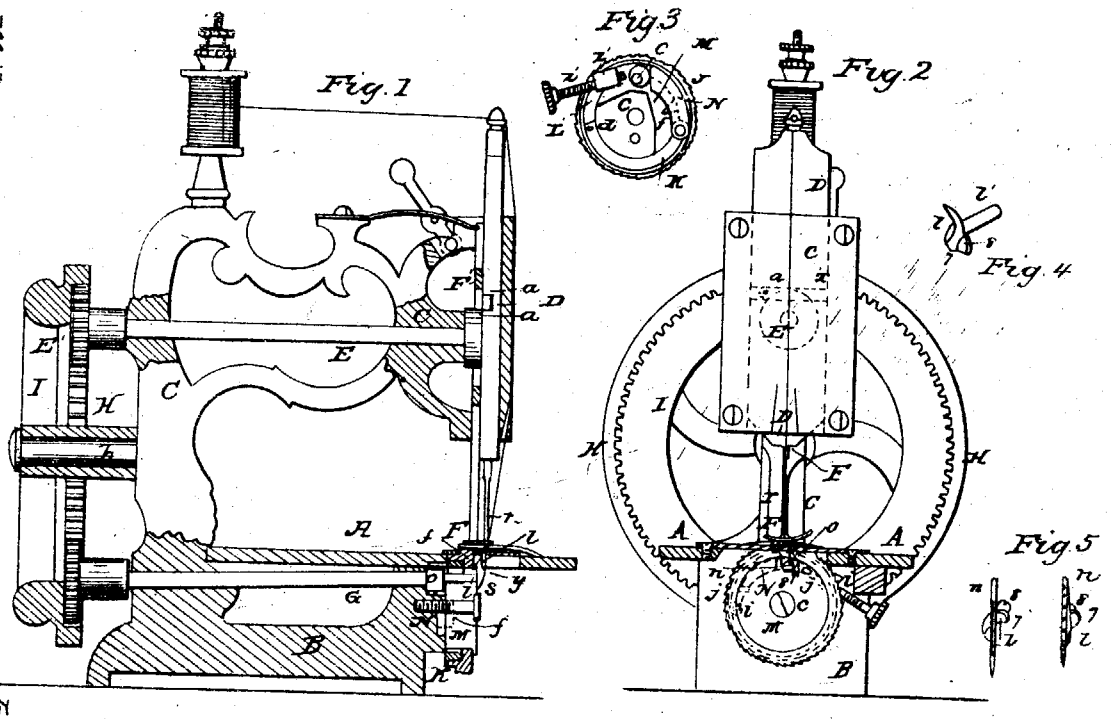
Witnesses
J. W. Coombs
R. S. Spencer
Inventor
C. Hodgkins
per Munn & Co
Attorneys

BEST AVAILABLE COPY

United States Patent Office.

CHRISTOPHER HODGKINS, OF MARLBORO, NEW HAMPSHIRE.

*Letters Patent No.* 33,085, *dated August* 20, 1861; *reissue No.* 2,746, *dated August* 20, 1867.

DIVISION B.

IMPROVEMENTS IN SEWING MACHINES.

The Schedule referred to in these Letters Patent and making part of the same.

TO ALL WHOM IT MAY CONCERN:

Be it known that I, CHRISTOPHER HODGKINS, of Marlboro, in the county of Cheshire, and State of New Hampshire, have invented certain new and useful Improvements in Sewing Machines; and I do hereby declare the following to be a full, clear, and exact description thereof, reference being had to the accompanying drawings, figures, and letters of reference thereon, making part of this specification. Of the said drawings—

Figure 1 is a back view, partly in section, of a machine with my improvements.

Figure 2 is a side elevation of the same, with the table in section.

Figure 3 is a view of the inner side of the feeding apparatus.

Figure 4 is a perspective view of the looper, larger than its real size.

Figure 5 is a view illustrative of the formation of the stitch.

Similar letters of reference indicate like parts in all the drawings.

Prior to the date of my invention the needle and stitch-forming mechanism in sewing machines had been driven by means of an external gear, working in pinions to increase the speed of the machine, such external gear being necessarily large and clumsy in order to multiply the speed of the pinions on the shafts.

My invention consists in the employment of an internal gear, in combination with pinions, arranged to drive the needle and stitch-forming mechanism of a sewing machine, as will be fully set forth hereafter.

To enable others skilled in the art to make and use my invention, I will describe the construction and operation thereof.

A is the bed, secured to a stand, B, to which is also firmly secured, or with which is cast, the stationary arm C, which, besides containing the guides for the needle-slide D, and for the stem F′ of the presser F, contains the bearing for the horizontal needle-operating shaft E, which is arranged some distance above the bed-plate. This shaft E is furnished at the extremity next the needle-slide with a crank, *a*, which works in a horizontal groove, *a′*, in the said slide, and so gives it the necessary reciprocating movement to carry the needle through and withdraw it from the cloth. G is both the looper-shaft and the feed-shaft, arranged in suitable bearings on the stand B, in a position immediately below the bed A, nearly horizontal and parallel with the shaft E. This shaft is furnished at the end of the machine farthest from the needle and looper with a spur-gear, G′, which is precisely similar in the size and number of its teeth to a gear, E′, on the needle-operating shaft E, and both of these gears gear with an internal toothed gear, H′, attached to or cast with the fly-wheel or driving-wheel I of the machine, which is fitted to rotate freely upon a fixed stud, *b*, secured in the stationary arm C, and which drives the two shafts E and G at the same speed. By having the teeth of the driving-gear arranged internally, I am enabled to make that gear of large size to drive the machine at a high rate of speed, and yet keep the machine within a very small compass with what would be necessary if the same speed were obtained from an externally toothed driving-gear. J is the feed-ring, fitted to rotate around a flanged circular block, M, which is secured firmly to the stand B by a screw, *c*. K L are two nearly semicircular arcs, fitted to the interior of the ring J. These arcs are connected together by a pin-joint, *d*, on one side of the ring, and on the opposite side thereof the arc K has pivoted to it, by a fulcrum-pin, *e*, a small curved lever, N, on which is a cam, *f*, which works against the face *g* of the corresponding end of the other arc. By forcing the free end *h* of the lever outwards from the centre of the ring, the arcs are both crowded so tightly against the interior of the ring that they cannot turn within it, and by a continued pressure against the said end *h* the lever, the jointed arcs, and the ring J are all caused to turn together on the block M. This action of the lever to turn the ring for feeding the cloth is effected by means of the cam O on the shaft G, and the arcs K L are moved back within the ring preparatory to the repetition of the feed movement by the action of the said cam against the point of the screw *i*, which is screwed through a block, *j*, on the inner side of the arc L. No obstacle is offered to the reverse movement of the arcs, as the lever N, when not pressed by the cam, tends, by its own weight, to free the arcs from the ring, which is prevented from moving back both by the action of the presser and by its own friction upon its supporting-block M. The length of the feed is regulated by turning the screw *i*, as that regulates the position to which the arcs K L move in a backward direction, their forward movement being always to the same position. This feed mechanism is complete without any spring, and therefore less likely to get out of order than most of the friction feeds. *l* is the rotary looper, having a straight stem, *l'*, which is inserted in the end of the shaft G, and secured therein by a set-screw or any other means. This stem passes through the block M, and consequently through the feed-ring J. The said looper consists of a simple hook, with a rounded heel, 7, concentric with the stem and shaft G, and with a guard, 8, protruding from the heel on the side opposite to the point of the looper, said guard being for the prevention of the loop from getting round the stem. This looper is very small as compared with other rotary loopers for making the chain-stitch, in order that its point may not, in its revolution, pass near so low as the lowest point reached by the eye of a needle of ordinary or less than ordinary length, as is illustrated in fig. 5, in which the needle *n* is represented in its lowest position, and the path of the point of the looper is represented by a dotted line. This looper enters the loop when its point is directly, or almost directly, below its axis of rotation, and not when it is above, as is the case with other rotary loopers. This action is illustrated in Figure 6, which represents the needle in the act of rising, and the looper in the act of entering the loop. As the ascent of the needle and rotation of the looper continue, the loop is extended by the looper, and gradually drawn round the heel 7 thereof, which keeps it extended as long as necessary, and then lets it slip off, and be drawn up through the cloth by the needle. By constructing, applying, and operating the looper to take the loop near the lowest position of its point, and thus enabling it to be made of very small size, less thread is taken through the cloth to form the stitch, and there is less to draw back again. In order to allow the point of the looper to work closer to the needle when it passes above the axis, and thereby to insure its taking the loop in the lower position, and prevent it from interfering with the needle in its higher position, the shaft G has the slight upward inclination towards the needle shown in fig. 1.

What I claim as my invention, and desire to secure by Letters Patent, is—

The internal gear H, in combination with the pinion E, for actuating a reciprocating needle, and the pinion G' for operating a looper or instrument for forming stitches in a sewing machine, substantially as described and for the purposes specified.

CHRISTOPHER HODGKINS.

Witnesses:

CHARLES SMITH,

CHAS. H. THURSTON